United States Patent [19]

Baacke et al.

[11] Patent Number: 5,116,586
[45] Date of Patent: May 26, 1992

[54] METHOD FOR THE REDUCTION OF NITROGEN OXIDES FROM WASTE GASES USING A ZEOLITE

[75] Inventors: Michael Baacke; Reinhold Brand; Bernd Engler, all of Hanau; Akos Kiss, Alzenau/Wasserlos; Peter Kleine-Möllhoff, Waldbuettelbrunn; Peter Kleinschmit, Hanau; Edgar Koberstein, Alzenau; Mustafa Siray, Hanau, all of Fed. Rep. of Germany

[73] Assignee: Degussa Aktiengesellschaft, Fed. Rep. of Germany

[21] Appl. No.: 448,198

[22] Filed: Dec. 14, 1989

[30] Foreign Application Priority Data

Dec. 14, 1988 [DE] Fed. Rep. of Germany ....... 3841990

[51] Int. Cl.$^5$ .................... B01J 8/00; C01B 21/00
[52] U.S. Cl. .................................................. 423/239
[58] Field of Search ......................... 423/239, 239 A

[56] References Cited

U.S. PATENT DOCUMENTS 4,018,706 4/1977 Inoue et al. .

FOREIGN PATENT DOCUMENTS

| | | |
|---|---|---|
| 0149966 | 7/1985 | European Pat. Off. . |
| 2411853 | 9/1974 | Fed. Rep. of Germany . |
| 2458888 | 6/1975 | Fed. Rep. of Germany . |
| 2842147 | 4/1979 | Fed. Rep. of Germany . |
| 3328653 | 2/1985 | Fed. Rep. of Germany . |
| 3635284 | 4/1988 | Fed. Rep. of Germany . |
| 3723072 | 1/1989 | Fed. Rep. of Germany . |
| 51-69476 | 6/1976 | Japan ................................. 423/239 |

OTHER PUBLICATIONS

Seiyama et al., "Catalytic Reduction of Nitric Oxide with Ammonia over Transition Metal Ion Exchanged Y Zeolites", *Chemistry Letters*, (1975), pp. 781-784.

*Primary Examiner*—Gregory A. Heller
*Attorney, Agent, or Firm*—Beveridge, DeGrandi & Weilacher

[57] ABSTRACT

A zeolite catalyst and a method for reduction of nitrogen oxides present in waste gas streams is described. The method includes mixing the waste gas containing nitrogen oxides with ammonia. At an elevated temperature, this mixture is passed over a zeolite catalyst. Preferably, the zeolite catalyst is in a monolithic or honeycomb form. The zeolite catalyst includes one or more of the following subgroup metals: copper, iron, molybdeum and cerium. The zeolite catalysts made in accordance with this invention show better conversion of nitrogen oxides and longer life than known catalysts.

57 Claims, 4 Drawing Sheets

FIG. 1

■ -Example - 18
● -Example - 33
▲ -Example - 42
+ -Reference Example

METHOD FOR THE REDUCTION OF NITROGEN OXIDES FROM WASTE GASES USING A ZEOLITE

BACKGROUND OF THE INVENTION

The invention relates to a zeolite catalyst and a method for the reduction of oxides of nitrogen present in waste gases containing oxygen, using this catalyst. The reduction takes place in the presence of ammonia, in which method, the waste gases containing nitrogen oxides are mixed with ammonia gas and passed at an elevated temperature over a zeolite catalyst containing a subgroup metal.

Nitrogen oxides, which arise in combustion processes, are among the main causes of acid rain and the environmental damage associated therewith. Therefore, their emission should be prevented by removing the nitrogen oxides from the waste gases before they are released into the environment.

Sources for the emission of nitrogen oxide into the environment are vehicular traffic; combustion plants, especially powerplants with furnaces; stationary internal combustion engines; and industrial plants. Vehicular traffic is a major contributor to the pollution problem.

A reduction of the nitrogen-oxide concentration in waste gas can be achieved in powerplants with boiler firing by using very pure fuels or by optimizing the combustion systems; however, these firing measures are subject to technical and economic limits. Because of these limitations, it has not been possible in the past to produce waste gas which is largely free of nitrogen oxides.

Waste gases from furnaces or from internal-combustion engines operated in an excessively stoichiometric manner usually contain a rather large amount of excess oxygen, in addition to the nitrogen oxides.

In order to assure an optimum utilization when employing reducing agents, selective, catalytic reduction methods are primarily considered for economic reasons for the removal of nitrogen oxides from waste gases.

It is already known that nitrogen oxides can be selectively reduced by treatment with a reducing gas, such as ammonia, in the presence of a catalyst. The ammonia gas reacts readily with the oxides of the nitrogen, but it reacts only to a slight extent with the oxygen.

In the catalytic reduction of nitrogen oxides, e.g. with $NH_3$, so-called full catalysts are used, e.g. in the form of bulk material or extrudate bodies, which exhibit numerous parallel conduits running in the direction of flow of the gas (monoliths or honeycombs). The term "full catalyst" denotes a catalytic body which comprises an active mass of catalytic material throughout. The active mass may also contain additives of carrier material in addition to the actual catalysts.

As a rule, subgroup metal oxides, e.g. oxides of vanadium, tungsten, molybdenum or iron, are used individually or in combination as catalytically active components (see DE-PS 24 58 888). Carrier materials with catalytically enhancing action can be $TiO_2$, $BaSO_4$ or $Al_2O_3$ (DE-PS 24 58 888 and DE-PS 28 42 147). In certain instances, such catalysts may also be compounded with noble metals such as platinum or palladium (U.S. Pat. No. 4,018,706).

Full catalysts in monolithic or honeycomb form are used because of the considerable abrasion and the low danger of clogging due to dust particles. This is problem in particular in the waste-gas range of furnaces, in which range the waste gas is still charged with dust. In instances in which the waste gas accumulates essentially dust-free, bulk catalysts or monolithic carrier catalysts may also be used.

Carrier catalysts with monolithic or honeycomb structure are better suited than bulk catalysts for the removal of nitrogen from waste gases with a low dust content. This is because the monolithic or honeycomb structure has a lower flow resistance. These catalysts are preferably used after a dust filter or behind a flue-gas desulfurization system.

These carrier catalysts include a catalytically inert structural strengthener with a coating of catalytically active material deposited on it. The catalytically active material can be mixed with a carrier material which acts to increase the surface area or as a so-called interspersant.

The structural strengthener usually used for this application are ceramic or metallic, chemically inert carriers with a honeycomb structure consisting e.g. of cordierite, mullite, $\alpha$-aluminum oxide, zirconia, zirconium mullite, barium titanate, porcelain, thorium oxide, steatite, boron carbide, silicon carbide, silicon nitride or fine steel.

All of the known catalysts have a number of disadvantages. The oxides of vanadium and molybdenum can be carried out of catalyst formulations containing vanadium and molybdenum by sublimation or by abrasion caused by the flue dust. These oxides contribute to the undesired contamination of the separated flue dust and the gypsum, produced in the desulfurization of flue gas with heavy metals.

Catalysts containing iron oxide with a high iron content can be irreversibly deactivated in sulfurous waste gases by means of sulfate formation.

The reactivation of used catalysts containing heavy metals, especially those containing vanadium and/or tungsten, for the purpose of removal of the heavy metal has not yet been evolved in such a fashion that a fully-developed method which is technically and economically satisfactory is available. Therefore, they can only be disposed of at a depository at the present time. Moreover, strict work area protection measures must be observed even during the production of such catalysts.

It has already been suggested in Chem. Letters 1975, (7), pp. 781–4 that zeolites of the Y-type containing copper and/or iron be used for the reduction of waste gases containing $NO_x$.

However, this zeolite type has proven to be very sensitive to acidic components in waste gases which are produced, for example, during the combustion of fossil fuels such as brown coal, hard coal or petroleum ($SO_2$, $SO_3$, HCl, HF or $NO_2$). An additional problem is the fact that water vapor is present in the mentioned waste gases in concentrations of approximately 8 to over 20% by volume.

It has also turned out that the specified zeolite structure is destroyed by the action of acid both at temperatures above the dew point and also if the dew point is dropped below at times, little by little by the process of dealuminization. This results in service lives for catalysts of this type which are too short to be of practical use.

DE-OS 33 28 653 indicates the use of a ceramic molecular sieve for the same application whose channel diameter should range from below the critical molecular diameter of ammonia to above the critical molecular diameter of nitrogen. The channel diameter should preferably be between 2.5 and 4.0 angstrom units. A sufficient definition of the molecular sieve in question is lacking in this publication; according to the data, it cannot be mordenite.

However, one of its features should reside in the fact that its surface should be free of any catalytic coating. Quantified data regarding activity is lacking.

DE-OS 36 35 284 suggests the use of a zeolite of the ZSM-5 type in the H form charged with subgroup metals for the same application. This catalyst is stable against acids, but its ion-exchange capacity is very small. In addition, the diameters of the zeolite pores are so small that it can be assumed that the indicated subgroup metals are not present in a form which is bound to the zeolites, but rather, in the form of an oxide precipitated onto the zeolite grain. The zeolite material thus probably functions only as carrier material for the subgroup metal oxides.

SUMMARY OF THE INVENTION

One feature of the invention is a method for the reduction of oxides of nitrogen present in waste gases containing oxygen in which the nitrogen oxides and the waste gases containing them are homogeneously mixed with ammonia gas. The mixture is passed at elevated temperatures over a zeolite catalyst containing a subgroup metal.

The method is characterized in that the reduction is carried out on an acid-resistant zeolite containing copper and/or iron at temperatures of 200°–600° C. and a space velocity of 1,000–60,000 $h^{-1}$. This corresponds to an area velocity of 0.5–100 $m^3/h \cdot m^2$ at standard temperature and pressure.

Catalysts containing copper as the sole metal with 0.2–5.2% by weight copper are especially suitable for use in $SO_2$-poor waste gases at flue-gas temperatures between 200 and 350° C.

Catalysts containing iron as the sole metal with 0.1–4.5% by weight iron are, on the other hand, suitable for use in flue gases with a temperature above 350° C.

Catalysts containing copper and iron in combination are suitable for use in flue gases with high $SO_2$ portions over a broad temperature range of approximately 280° to 550° C.

Figure 4:
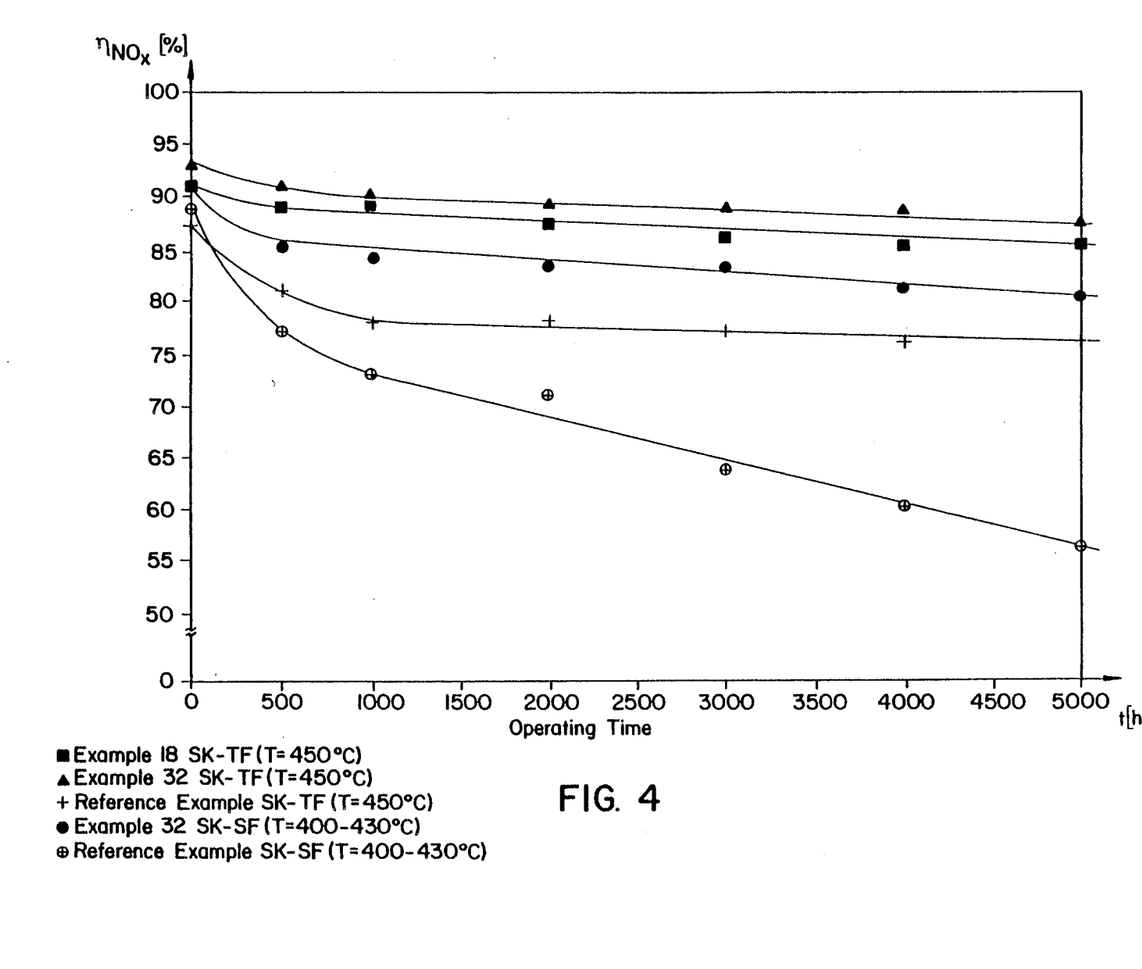
FIG. 4 shows the change in $NO_x$ conversion as a function of time for various samples at various temperatures.

A considerable improvement of the reductive action as well as a distinct decrease of the activity drop is realized during long-time use in flue gases of hard coal dry furnaces with operating temperatures over 350° C. (cf. FIGS. 2,4), if the zeolite also contains cerium in a bond with the zeolite and/or present as oxide on its surface. In addition, it was surprisingly found that catalysts of this type exhibit a significantly improved fatigue strength when used in the particularly problematic flue gases of hard coal slag tap furnaces in comparison to catalysts based on titanium oxide with tungsten oxide and vanadium pentoxide as active components (according to DE-PS 24 58 888) (FIG. 4). This makes it possible for the first time to use catalysts in the "high-dust operation" of such furnaces with industrially feasible, long service lives, since the abovementioned reference catalysts are subject to a rapid deactivation. This is primarily caused by heavy metals present in the flue gas.

Figure 2:
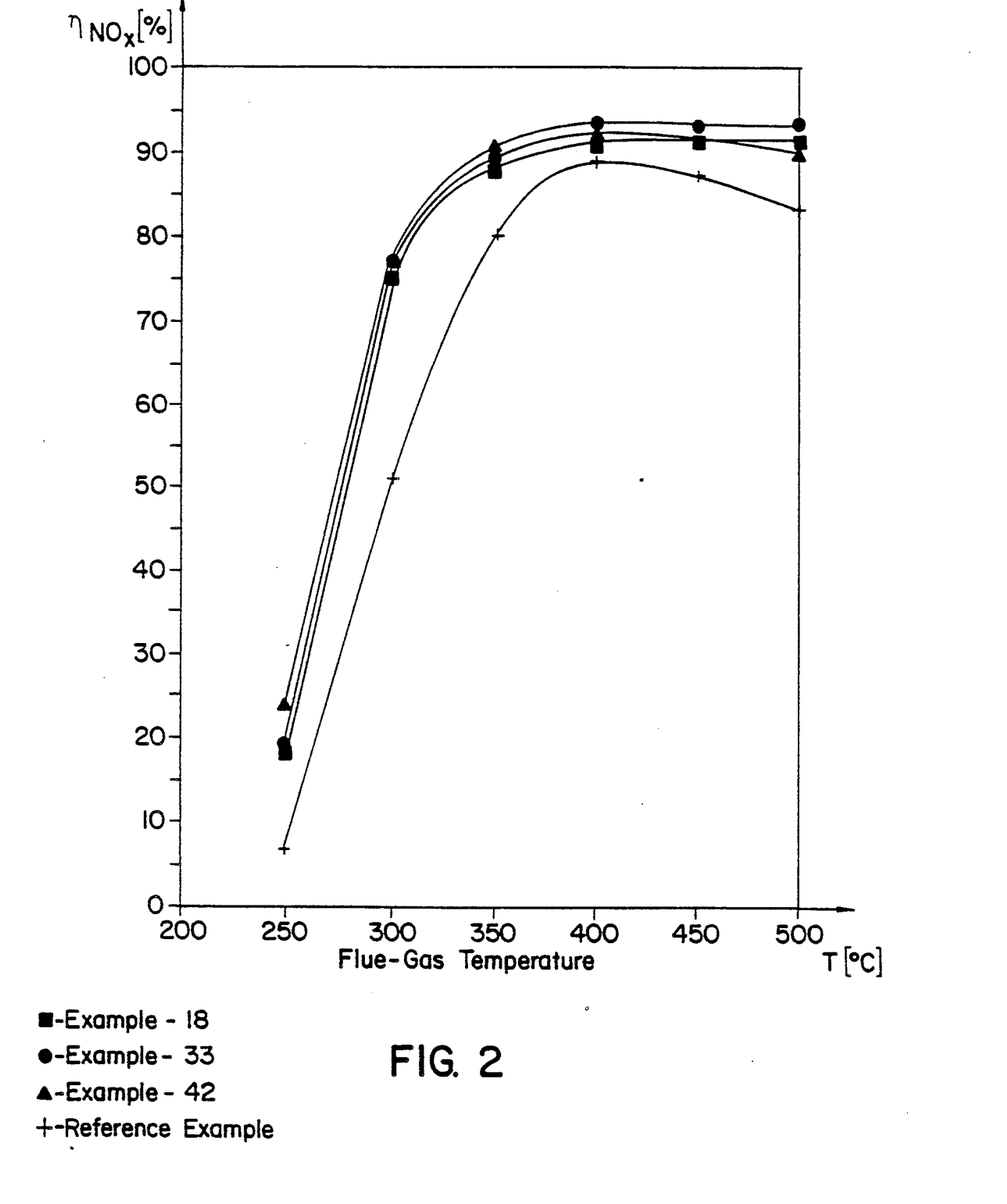
FIG. 2 is similar to FIG. 1, using different examples, and includes a comparison to the reference example.

A surprisingly dramatic increase in activity, especially for the use as nitrogenoxide-removal catalysts, in a temperature range between 250° and 350° C. is obtained if the zeolite also contains molybdenum The molybdenum is also bonded with the zeolite and/or is present as oxide on its surface (cf. FIG. 2). This variant is especially useful for the retrofitting of gas-fired industrial plants and use after a desulfurization system in powerplants.

A particularly suitable acid-resistant zeolite is one of the mordenite type preferably exhibiting a $SiO_2$: $Al_2O_3$ molar ratio (or modulus) of over 8.

Ratios of 10–30, especially 15 and 25 have especially proven themselves for practical use in flue gases of coal furnaces exhibiting a high amount of acidic components. This is due to the fact that mordenites of this type are subject to practically no demonstrable dealuminization during use, nevertheless possess a sufficiently high metal-adsorption capacity.

It is within the scope of this invention to use a zeolite which is charged within its ion-exchange capacity with the subgroup metals copper and/or iron as well as, optionally, cerium or molybdenum. The introduction of metals or metal compounds into the zeolite can take place according to various preparatory methods. They include ion exchange and impregnation or precipitating, as well as the mixing of oxides or metal salts with the zeolite with subsequent calcination in an oxidizing or reducing atmosphere or in an evolving ammoniacal atmosphere. For example, oxides of the provided metals can be deposited onto the zeolite surface with the last-named preparatory method by performing a thermal decomposition of a metal-salt impregnation or of a precipitate or co-precipitate in air. Suitable metal salts have proven to be, among others, copper sulfate, copper nitrate, copper acetate, iron sulfate, iron nitrate, cerium nitrate, cerium acetate and ammonium molybdate.

According to advantageous embodiments of the invention, the zeolite used comprises a total content of subgroup metals of 0.1 to 13.5% by weight, preferably 0.2 to 7.5% by weight and especially 0.3 to 5% by weight relative to the zeolite weight.

It was found to be especially advantageous if a zeolite containing copper contains at least 0.2%, and at the most 5.2%, by weight of this element relative to the weight of the zeolite.

It was also found to be especially advantageous if a zeolite containing iron contains at least 0.1%, and at the most 4.5%, by weight of this element relative to the weight of the zeolite.

The best results for use in coal furnaces with flue-gas temperatures above 350° C. are obtained if a zeolite with 0.2–5.2% by weight copper and/or 0.1–4.5% by weight iron is used, each in combination with 0.1–1.0% by weight cerium, relative to the zeolite weight.

The best results are obtained for use at flue-gas temperatures between 250° and 350° C. if a zeolite with 0.2–5.2% by weight copper and/or 0.1–4.5% by weight iron is used, each in combination with 0.2–2.5% by weight molybdenum, relative to the zeolite weight.

In the method of the invention, concentrations of the catalytically active metal or catalytically active metals may be introduced into the zeolite solely by ion exchange. In most applications, this method produces zeolites with a sufficient concentration of the metal or metals. This method of preparation is therefore preferred. However, zeolites modified according to the other methods of introduction mentioned above can also readily lead to suitable results.

The ion exchange, that is, the conversion of the $H^+$ form or of the $Na^+$ form of the zeolite into the transitionmetal form, can take place according to known preparatory techniques (see D. W. Breck, *Zeolite Molecular Sieves*, John Wiley and Sons, New York, 1974). The optimum preparation parameters worked out within the framework of the present invention are described in more detail in the examples which follow.

The zeolite catalyst can be used in the method of the invention either as a surface coating on a formed, ceramic or metallic carrier which is resistent to the waste gases, or it may be a full catalyst, preferably in monolithic or honeycomb form. Full catalysts can be obtained by working in a suitable binder such as $TiO_2$ (anatase), $TiO_2$-$WO_3$-mixed oxide or bentonite and pressing or extruding in a known manner.

The reduction of the nitrogen oxides takes place using the preferred embodiments of the catalyst in a temperature range of 250–550° C., preferably 280–500° C., and especially 300–480° C.

Moreover, it has also proven to be advantageous to carry out the reduction at a space velocity of 2,000–40,000 $h^{-1}$, preferably 3,000–20,000 $h^{-1}$ and especially 5,000–10,000 $h^{-1}$, which correspond to a catalyst surface load of 1–70 $m^3/h\cdot m^2$, preferably 3–45 $m^3/h\cdot m^2$, and especially 5–15 $m^3/h\cdot m^2$ (all at standard temperature and pressure).

Finally, it has also proven to be advantageous to use a molar ratio between nitrogen oxide and the reduction agent ammonia of 0.6–1.6, preferably 0.7–1.1, and especially 0.8–1.0. In the present method, an oxygen component of at least 0.1% by volume, better yet, of more than 0.5% by volume, or even over 1.0% by volume should be present in the waste gas in order to be able to achieve the full efficiency of the catalyst.

BRIEF DESCRIPTION OF THE DRAWINGS

The invention will now be described by way of various examples, with reference to the accompanying drawings, which include FIGS. 1–4, briefly described as follows.

DETAILED DESCRIPTION OF THE INVENTION

The invention is explained further in the following, using examples of particular embodiments. The activity of the catalysts was first tested with a dust-free gas in a laboratory test system, and then with the waste gas of an oil-furnace system. Long-term tests were carried out with the flue gas of a hard coal dry furnace and with a hard coal slag tap furnace (cf. FIG. 4).

In the tests in the laboratory test system and in the oil furnace, catalysts made with the zeolites containing a subgroup metal applied onto a monolithic carrier of mullite with a cell division (1 web +1 opening) of 2 mm were used. The long-term tests in dusty flue gases of coal furnaces were carried out, on account of the abrasive qualities of the flue ash, with full catalysts made from the zeolites of the invention. The test systems for this test were either connected in a bypass to the flue-gas current or integrated into said current.

The catalysts made according to the invention exhibited significant superiority over the state of the art in the long-term tests in coal furnaces, especially at flue-gas temperatures above 350° C., as well as in an especially clear fashion when used after hard-coal slag tap furnaces.

EXAMPLES 1-7

A 0.1–0.25 molar copper-salt solution is prepared by dissolving copper sulfate in 50 liters deionized water. The pH of the solution is adjusted between 1 and 10 by adding sulfuric acid or ammonia. Concentration and pH adjustment depend on the copper concentration desired in the final product of copper-mordenite.

The solution prepared in this manner is heated to 80° C. Then, 25 kg H-mordenite with a modulus ($SiO_2/Al_2O_3$ molar ratio) of 19 is introduced.

The mordenite suspension is maintained at 80° C. under further agitation for 30 minutes and subsequently filtered. The filter cake obtained thereby is rewashed twice with deionized water. The drying of the copper-mordenite can take place either at 120° C. in a tray furnace or by spray drying. The chemical composition and the characteristic physical data of the H-mordenite are indicated in table 1.

TABLE 1

| Chemical composition and characteristic physical data of H-mordenite with modulus 19 | | |
|---|---|---|
| $SiO_2$ | 74.98 | % by weight |
| $Al_2O_3$ | 6.70 | % by weight |
| $Na_2O$ | 0.21 | % by weight |
| BET surface | 500 | $m^2/g$ |
| Phase analysis | | Mordenite |

Test conditions regarding the copper concentration and the pH of the exchange solutions as well as the copper contents of the mordenite catalysts are indicated in table 2.

TABLE 2

| Example No. | Cu-Concentration in the exchange solution [molar] | pH of the exchange solution | Cu-content in the Cu-Mordenite [Wt %] |
|---|---|---|---|
| 1 | 0.1 | 1.5 | 0.3 |
| 2 | 0.1 | 2.2 | 0.7 |
| 3 | 0.1 | 3.5 | 1.2 |
| 4 | 0.25 | 3.2 | 1.4 |
| 5 | 0.1 | 9.3 | 2.6 |
| 6 | 0.1 | 10.0 | 4.5 |
| 7 | 0.1 | 10.8 | 5.2 |

The conversion of the catalytic powder into industrially usable forms is described in preparation methods A and B presented further below.

EXAMPLES 8-13

25 kg of H-mordenite is introduced analogously to the method described in examples 1-7 into a 0.1–0.25 molar iron-nitrate nitrate solution under agitation at 80° C. The pH of the exchange solution is adjusted beforehand to between 1 and 2. The exchange time is 30 minutes.

Depending on the final concentration desired, the exchange method is optionally repeated several times. The work-up of the iron-mordenite takes place as described in examples 1-7.

Test conditions regarding the iron concentration and the pH of the exchange solutions as well as the number of exchanges are indicated in table 3 in conjunction with the iron contents of the final product.

TABLE 3

| Example No. | Fe-Concentration in the Exchange Solution [molar] | pH of the Exchange Solution | Number of Exchanges | Fe-Content in the Fe-Mordenite [Wt %] |
| --- | --- | --- | --- | --- |
| 8 | 0.1 | 1.0 | 1 | 0.2 |
| 9 | 0.1 | 1.5 | 1 | 0.5 |
| 10 | 0.1 | 2.3 | 1 | 0.8 |
| 11 | 0.17 | 2.2 | 1 | 1.2 |
| 12 | 0.1 | 2.3 | 2 | 2.1 |
| 13 | 0.17 | 2.2 | 3 | 4.0 |

The conversion of the catalytic powder into industrially usable forms is described in preparation methods A and B presented further below.

EXAMPLES 14–26

25 kg of the H-mordenite, described in more detail in examples 1–7, is introduced analogously to the method described in the named examples into 50 liters of an aqueous solution containing both copper salt and iron salt under agitation at 80° C. The exchange time is 30 minutes. The exchange method is optionally repeated several times. The work-up of the copper-iron-mordenite likewise takes place according to the method described in examples 1–7.

Test conditions and the metal contents of the final product are indicated in table 4.

TABLE 4

| Example No. | Metal Concentration in the Exchange Solution [molar] | | pH of the Exchange Solution | Metal Content of the CuFe-Mordenite [Wt %] | |
| --- | --- | --- | --- | --- | --- |
| | Cu | Fe | | Cu | Fe |
| 14 | 0.1 | 0.1 | 1.2 | 0.3 | 0.1 |
| 15 | 0.1 | 0.1 | 1.5 | 0.8 | 0.6 |
| 16 | 0.1 | 0.05 | 2.3 | 1.0 | 0.2 |
| 17 | 0.1 | 0.12 | 1.1 | 1.0 | 0.7 |
| 18 | 0.1 | 0.1 | 2.4 | 1.0 | 0.6 |
| 19 | 0.1 | 0.1 | 9/1.2* | 2.2 | 0.3 |
| 20 | 0.1 | 0.1 | 9/2.3* | 2.6 | 0.7 |
| 21 | 0.1 | 0.1 | 10/1.3* | 4.5 | 0.8 |
| 22 | 0.1 | 0.1 | 1.1 | 0.1 | 0.2 |
| 23 | 0.25 | 0.1 | 1.2 | 0.2 | 0.4 |
| 24 | 0.1 | 0.1 | 1.3 | 0.4 | 0.8 |
| 25 | 0.1 | 0.1 | 1.6 | 1.1 | 1.1 |
| 26 | 0.1 | 0.05 | 1.5 | 0.1 | 1.5 |
| 27 | 0.1 | 0.18 | 3.5/2.3* ** | 1.2 | 4.6 |

*Copper was applied in a basic or less sharply acidic medium, and iron was applied in an acidic medium in two successive steps
**three successive exchange steps for iron The conversion of the catalytic powder into industrially usable forms is described in preparation methods A and B presented further below.

EXAMPLES 28–35

The catalysts listed in table 5 are prepared according to the method described in examples 1–27. The introduction of the cerium takes place in examples 28, 30 and 32 by means of a second, subsequent ion exchange using a mordenite containing copper and/or iron which exchange is carried out with a 0.1 molar cerium-salt solution at 80° C. A comparable catalytic effect is achieved by a subsequent impregnation, carried out according to examples 29, 31 or 33, of the mordenite already present as extrudate and containing copper and/or iron with cerium-nitrate solutions. In the case of example 35, the addition of an appropriate amount of solid, finely powdered cerium oxide to the mordenite mass containing copper and iron took place before the shaping process described in preparation methods A and B.

TABLE 5

| Example No. | Metal Content in the Mordenite [Wt %] | | | Method of Cerium Doping | | |
| --- | --- | --- | --- | --- | --- | --- |
| | Cu | Fe | Ce | Exchange | Subsequent Impregnation | Addition of Solid |
| 28 | 1.2 | — | 0.5 | x | — | — |
| 29 | 1.2 | — | 0.5 | — | x | — |
| 30 | — | 0.84 | 0.5 | x | — | — |
| 31 | — | 0.84 | 0.5 | — | x | — |
| 32 | 1.0 | 0.58 | 0.1 | x | — | — |
| 33 | 1.0 | 0.58 | 0.5 | — | x | — |
| 34 | 1.0 | 0.58 | 1.0 | — | — | — |
| 35 | 1.0 | 0.58 | 1.0 | — | — | x |

The conversion of the catalytic powder into industrially usable forms is described in preparation methods A and B presented further below.

EXAMPLES 36–39

25 kg of H-mordenite is introduced according to the methods described in example 6 under agitation at 80° C. into 50 liters of a 0.1–0.18 molar copper-nitrate solution at pH=9 or 10 (cf. table 6). The exchange time is 30 minutes. The work-up of the Cu-mordenite takes place according to the method described in examples 1–7. As described in preparation method A, a mullite honeycomb body with a 2 mm cell division (web + cell opening) is coated. A subsequent impregnation of the honeycomb body with an aqueous ammonium-molybdate solution then follows, as described in the prior art.

TABLE 6

| Example No. | Metal Concentration in the Exchange Solution [molar] | Metal Concentration in the CuMo-Mordenite [Wt %] | |
| --- | --- | --- | --- |
| | Cu | Cu | Mo |
| 36 | 0.1* | 0.8 | 0.3 |
| 37 | 0.15* | 1.3 | 0.3 |
| 38 | 0.18* | 1.7 | 0.7 |
| 39 | 0.1** | 4.1 | 0.3 |

*pH of the initial solution: pH = 9
**pH of the initial solution: pH = 10

The conversion of the catalytic powder into industrially usable forms is described in preparation methods A and B presented further below.

EXAMPLES 40–44

25 kg of mordenite containing iron and/or copper, which were prepared according to the methods described in examples 1–35, is introduced in the case of examples 40, 41 and 42 under agitation at 80° C. into 50 liters of a 0.1 molar ammonium molybdate solution at pH 9–10. The exchange time is 30 minutes. The work-up of the FeMo and/or CuFeMo mordenite takes place according to the method described in examples 1–7. In example 43, the molybdenum is added by means of subsequent impregnation of the mordenite already present as extrudate with ammonium molydbate solution. In Example 44, the molybdenum is added by means of the addition of an appropriate amount of finely powdered molybdenum oxide to the mordenite mass containing the copper and iron before the shaping process described in preparation methods A and B. Table 7 indicates copper, iron and molybdenum contents int he final product, as well as the particular preparation method.

TABLE 7

| Example No. | Metal Content in the FeMo and/or Cu Fe Mo Mordernite [Wt %] | | | Method of Molybdenum Doping | | |
|---|---|---|---|---|---|---|
| | Cu | Fe | Mo | Exchange | Subsequent Impregnation | Addition of Solid |
| 40 | — | 0.8 | 0.3 | x | — | — |
| 41 | 2.2 | 0.3 | 0.3 | x | — | — |
| 42 | 1.0 | 0.6 | 0.3 | x | — | — |
| 43 | 1.0 | 0.6 | 0.8 | — | x | — |
| 44 | 1.0 | 0.6 | 1.3 | — | — | x |

The conversion of the catalytic powder into industrially usable forms is described in preparation methods A and B presented further below.

EXAMPLES 45-56

CuFe-, CuFeCe- and CuFeMo-mordenite catalysts are prepared in accordance with the methods described in examples 14-44. H-mordenite with different moduli (SiO$_2$/Al$_2$O$_3$ molar ratio) were used as the initial materials.

Table 8 shows the chemical compositions of the H mordenite used.

TABLE 8

| Modulus | Portion Wt. | | |
|---|---|---|---|
| | SiO$_2$ | Al$_2$O$_3$ | Na$_2$O |
| 10 | 86.8 | 14.0 | 0.08 |
| 15 | 89.5 | 10.1 | 0.07 |
| 19 | 91.8 | 8.2 | 0.05 |
| 25 | 93.8 | 6.4 | 0.04 |

Table 9 lists the prepared CuFe-mordenite catalysts with different modulus values.

TABLE 9

| Example No. | Modulus | Metal Content in the Final Product [Wt %] | |
|---|---|---|---|
| | | Cu | Fe |
| 45 | 10 | 0.6 | 0.4 |
| 46 | 15 | 0.7 | 0.5 |
| 47 | 19 | 0.8 | 0.6 |
| 48 | 25 | 0.8 | 0.5 |

Table 10 lists the prepared CuFe/Ce-mordenite catalysts with different modulus values.

TABLE 10

| Example No. | Modulus | Metal Content in the Final Product [Wt %] | | |
|---|---|---|---|---|
| | | Cu | Fe | Ce |
| 49 | 10 | 0.6 | 0.4 | 0.5 |
| 50 | 15 | 0.7 | 0.5 | 0.5 |
| 51 | 19 | 0.8 | 0.6 | 0.5 |
| 52 | 25 | 0.8 | 0.5 | 0.5 |

Table 11 lists the prepared CuFeMo-mordenite catalysts with different modulus values.

TABLE 11

| Example No. | Modulus | Metal Content in the Final Product [Wt %] | | |
|---|---|---|---|---|
| | | Cu | Fe | Mo |
| 53 | 10 | 0.6 | 0.4 | 0.3 |
| 54 | 15 | 0.7 | 0.5 | 0.3 |
| 55 | 19 | 0.8 | 0.6 | 0.3 |
| 56 | 25 | 0.8 | 0.5 | 0.3 |

The conversion of the catalytic powder into industrially usable forms is described in preparation methods A and B presented further below.

PREPARATION METHOD A

Preparation of carrier catalysts 10 kg of a catalyst described in examples 1-56 are stirred into 25 liters deionized water. 5% by weight bentonite relative to the catalyst is added to the suspension obtained in this manner under continued agitation as binder. In order to assure an optimum binding of the binder, a pH between 8.5 and 10.0 must be maintained in the suspension. The coating of a ceramic honeycomb body of mullite takes place by immersing the ceramic carrier into the aqueous suspension. The mullite has parallel conduits with a quadratic cross section and a cell division (1 web +1 opening) of 2 mm.

Following the immersion step, the conduits of the monolithic carrier are blown open with compressed air and then dried at 150° C. in an air current. The coating process must be repeated until approximately 160 g catalyst mass per cubic decimeter of carrier volume has been applied. The coated and dried honeycomb bodies are tempered for two hours at 550° C.

As an alternative to the method described, the coating suspension can be prepared by the following method. After the washing out of the catalytically activated mordenite provided in examples 1-56, the latter is resuspended in deionized water together with the 5% by weight bentonite as binder. In order that a fine catalyst grain containing binder be produced, the mixture is agitated 14 hours and then a spray drying is carried out. The catalyst grain is then processed as described above. The copper, iron molybdenum and/or cerium can be added in the form of their salts or oxides at the same time as the binder.

A subsequent impregnation of carrier catalysts corresponding to examples 29,31,33 or 43 with the metals mentioned above takes place by taking up an amount of metal-salt salt solution which corresponds to the water capacity of the coated carrier. After the impregnation process, the catalyst is dried at 150° C. Then it is tempered two hours at 550° C.

PREPARATION METHOD B

Preparation of full catalysts

A metal-containing mordenite catalyst is prepared according to the method described in examples 1-56. 10 kg of this catalytic powder are mixed with 5 kg titanium oxide of the anatase type, 700 kg alkali-free clay and 300 g glass fibers (1-2 cm in length) and kneaded under the addition of 2 kg 15% aqueous ammonia solution of 10 liters water. 100 g lactic acid, 150 g wood pulp, 70 g polyethylene oxide and 120 g carboxymethylcellulose are added as a forming agent. In the case of examples 35 and 44, the oxides of copper, iron, molybdenum, and/or cerium are also added in solid form.

The mixture is kneaded for 5-8 hours to form a homogeneous paste. The water content is adjusted in order to adjust the plasticity suitable for the forming. The catalytic mass is then pressed with an extruder to honeycomb bodies with parallel conduits with a quadratic cross section with a cell division of 3.7 mm (1 web +1 opening). After drying at a rising temperature from 20°-60° C. in a climatic chamber, the honeycomb bodies are calcined for 24 hours at a rising temperature from 300-600° C.

A subsequent impregnation of full catalysts with active metals can take place as described under preparation method A.

REFERENCE EXAMPLE

A catalyst prepared according DE-PS 24 58 888, example X-1 No. 5, as a reference example, with a weight ratio of $TiO_2/WO_3$ of 9 : 1, and a $V_2O_5$ portion per 100 g $TiO_2/WO_3$ mixed oxide of 0.5 g was prepared in the form of an extruded honeycomb with the geometry described in preparation method B. This catalyst exhibits results inferior to examples 18,33 and 42 even in short-time tests in a temperature range of 300°–450° C. See FIG. 2.

RESULTS

The catalysts prepared according to examples 1–56 were tested in the waste gas of an oil furnace. The waste gas was adjusted by adding in the polluting gases NO and $SO_2$ and the amount of ammonia necessary for the reduction of nitrogen oxide in accordance with the test conditions indicated below.

| Test conditions | |
|---|---|
| Composition of waste gas: | $NO_x$ 800 ppm (vol.) |
| | $NH_3$ 800 ppm (vol.) |
| | $SO_2$ 500 ppm (vol.) |
| | $O_2$ 5.0% by vol. |
| | $H_2O$ 11.0% by vol. |
| | $CO_2$ 12.0% by vol. |
| | $N_2$ remainder |

Figure 1:
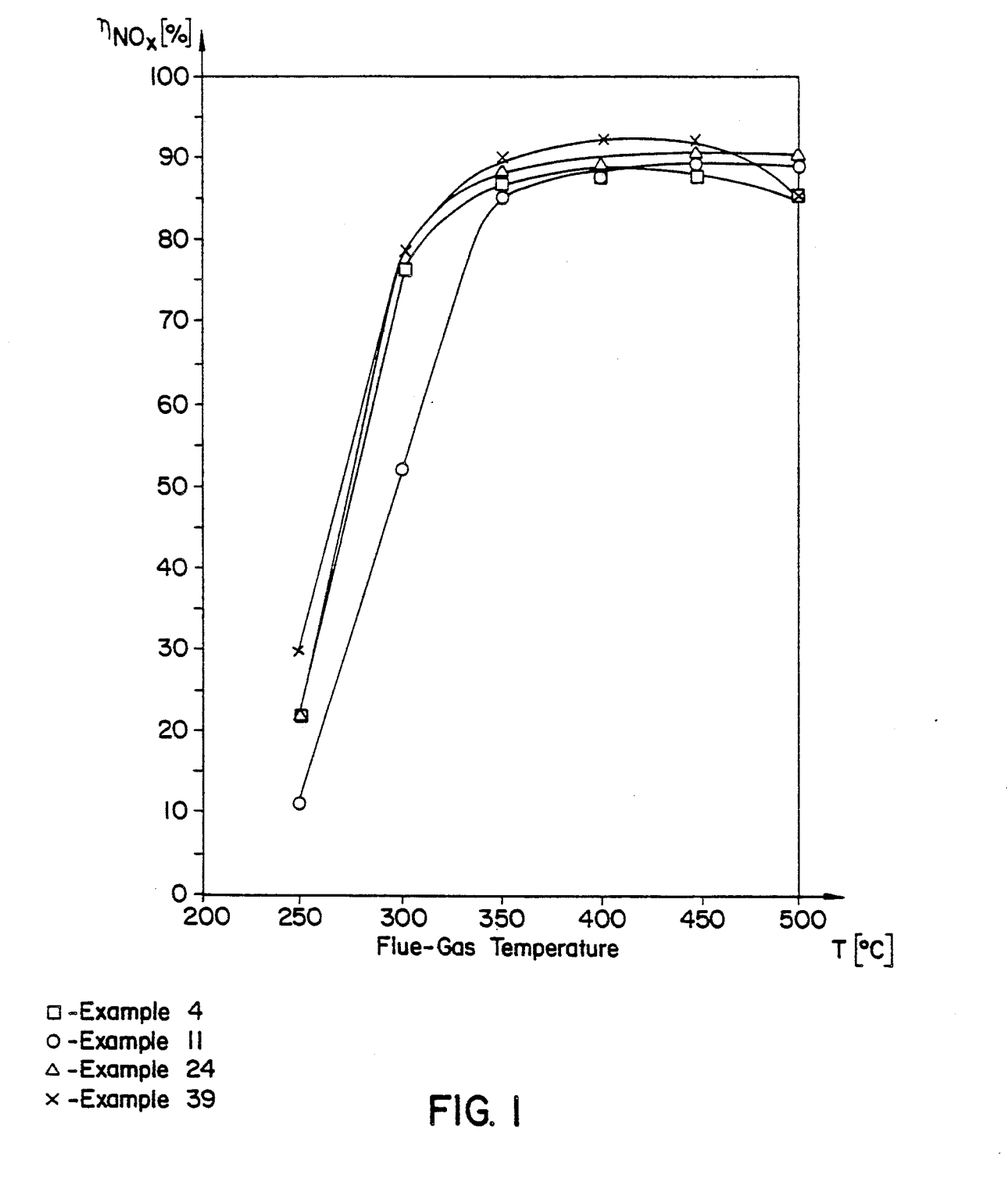
FIG. 1 shows the values for NOx conversions ($\eta$ $NO_x$) for various examples as a function of the flue-gas temperature.
Figure 3:
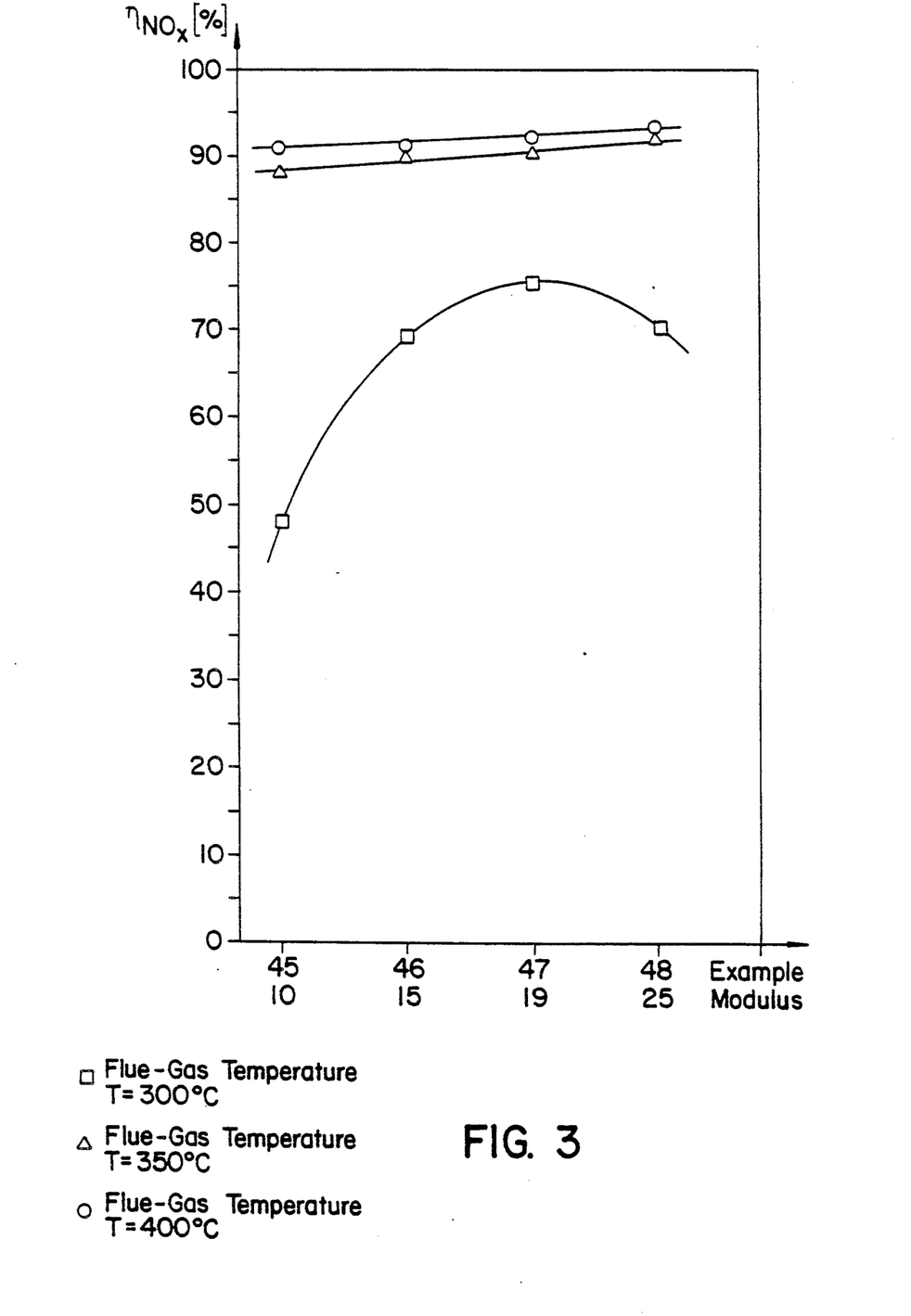
FIG. 3 shows the NOx conversions for different samples at a variety of temperatures.

The catalytic tests were carried out in a temperature range of 200°–600° C. and at a space velocity of 20,000 $h^{-1}$. Selected results of the measurements are shown in the graphs of FIGS. 1 to 3 and the base values are collated in tables 12,13.

TABLE 12

| Flue-gas Temperature [°C.] | Example No. | | | | | | | Reference Example |
|---|---|---|---|---|---|---|---|---|
| | 4 | 11 | 18 | 24 | 33 | 39 | 42 | |
| 250 | 22 | 11 | 18 | 22 | 19 | 30 | 24 | 7 |
| 300 | 76 | 52 | 75 | 78 | 77 | 78 | 77 | 51 |
| 350 | 87 | 85 | 88 | 88 | 89 | 90 | 90 | 80 |
| 400 | 88 | 88 | 91 | 89 | 93 | 92 | 92 | 89 |
| 450 | 87 | 89 | 91 | 90 | 93 | 92 | 91 | 87 |
| 500 | 85 | 89 | 91 | 90 | 93 | 85 | 90 | 83 |

*The indicated values are $NO_x$ conversions ($\eta\,NO_x$) in percent relative to the initial $NO_x$ concentration $$\eta NO_x = \frac{[NO_x]_{before\ cat.} - [NO_x]_{after\ cat.}}{[NO_x]_{before\ cat}}$$

TABLE 13*

| Flue-Gas Temperature T/°C. Example | 300 | 350 | 400 | 450 | 500 |
|---|---|---|---|---|---|
| 45 | 48 | 88 | 91 | 92 | 91 |
| 46 | 69 | 90 | 91 | 91 | 91 |
| 47 | 75 | 90 | 92 | 91 | 91 |
| 48 | 70 | 92 | 93 | 93 | 92 |

*The indicated values are $NO_x$ conversions ($\eta NO_x$) in percent relative to the initial $NO_x$ concentration. See note after Table 12.

Long-term tests were carried out with full catalysts in accordance with examples 18 and 32 as well as with the reference example both int eh flue gas of a hard coal dry furnace at an average operating temperature of 450° C. and in the flue gas of a furnace at operating temperatures between 400° and 430° C. In both instances, the reference example proved to be inferior to the catalysts of the invention with respect to the long-term behavior (see FIG. 4).

TABLE 14*

| Operating Time [h] | Hard-Coal Dry Furnace T = 450° C. | | | Hard-Coal Slag Tap T = 400–430° C. | |
|---|---|---|---|---|---|
| | Example | | Reference Example | Example | Reference Example |
| | No. 18 | No. 32 | | No. 32 | |
| | 18 | 32 | | 32 | |
| 0 | 91 | 93 | 87 | 91 | 89 |
| 500 | 89 | 91 | 81 | 85 | 77 |
| 1000 | 89 | 90 | 78 | 84 | 73 |
| 2000 | 87 | 89 | 78 | 83 | 71 |
| 3000 | 86 | 89 | 77 | 83 | 64 |
| 4000 | 85 | 88 | 76 | 81 | 60 |
| 5000 | 85 | 87 | 76 | 80 | 56 |

*The indicated values are $NO_x$ conversions ($\eta NO_x$) in percent relative to the initial $NO_x$ concentration.

While the invention has been described in conjunction with particular embodiments and reaction conditions, various modifications may be made without departing from the spirit and scope of the invention, as defined in the following claims.

German Priority Application P 38 41 990.4 is relied on and incorporated herein by reference.

We claim:

1. A method for the reduction of oxides of nitrogen present in waste gases containing oxygen, comprising mixing the waste gases containing nitrogen oxides with ammonia gas and passing said mixture at a temperature in the range of from 200°–600° C. with a space velocity of 1,000– 60,000 $h^{-1}$ corresponding to a catalyst area velocity of 0.5–100 $m^3/h \cdot m^2$ at standard temperature and pressure over a mordenite type zeolite catalyst including 0.2–5.2% by weight copper, 0.1–4.5% by weight iron and 0.1–1.0% by weight cerium relative to the zeolite weight.

2. The method according to claim 1, wherein the mordenite type zeolite exhibits a $SiO_2:Al_2O_3$ molar ratio of more than 8.

3. The method according to claim 1, wherein the catalyst is used as a surface coating on a chemically inert, formed carrier constructed from a ceramic or a metal.

4. The method according to claim 3, wherein said carrier is in a monolithic form, a honeycomb form, or a bulk form.

5. The method according to claim 1, wherein said temperature is in the range of 250°–550° C.

6. The method according to claim 1, wherein said space velocities are in the range of 2,000–40,000 $h^{-1}$, corresponding to a catalyst-area velocity of 1–70 $m^3/h \cdot m^2$.

7. The method according to claim 1, wherein the molar ration between nitrogen oxide and ammonia is in the range of 0.6–1.6.

8. The method according to claim 1, wherein an oxygen component of at least 0.1% by volume is present in the waste gas.

9. The method according to claim 1, wherein the mordenite type zeolite exhibits a $SiO_2:Al_2O_3$ molar ratio in the range of 10–30.

10. The method according to claim 1, wherein the mordenite type zeolite exhibits a $SiO_2:Al_2O_3$ molar ratio in the range of 15–25.

11. The method according to claim 1, wherein the catalyst is formed with a binder, said catalyst is used as a form body in monolithic form, a honeycomb form, or a bulk form.

12. The method according to claim 1, wherein said temperature is in the range of 280°–500° C.

13. The method according to claim 1, wherein said temperature is in the range of 300°–480° C.

14. The method according to claim 1, wherein said space velocities are in the range of 3,000–20,000 h$^{-1}$, corresponding to a catalyst-area velocity of 3–45 m$^3$/h·m$^2$.

15. The method according to claim 1, wherein said space velocities are in the range of 5,000–10,000 h$^{-1}$, corresponding to a catalyst-area velocity of 5–15 m$^3$/h·m$^2$.

16. The method according to claim 1, wherein the molar ratio between nitrogen oxide and ammonia is in the range of 0.7–1.1.

17. The method according to claim 1, wherein the molar ratio between nitrogen oxide and ammonia is in the range of 0.8–1.0.

18. The method according to claim 1, wherein an oxygen component of at least 0.5% by volume is present in the waste gas.

19. The method according to claim 1, wherein an oxygen component of at least 1.0% by volume is present in the waste gas.

20. A method for the reduction of oxides of nitrogen present in waste gases containing oxygen, comprising mixing the waste gases containing nitrogen oxides with ammonia gas and passing said mixture at a temperature in the range of from 200°–600° C. with a space velocity of 1,000–60,000 h$^{-1}$ corresponding to a catalyst area velocity of 0.5–100 m$^3$/h·m$^2$ at standard temperature and pressure over a mordenite type zeolite catalyst including 0.2–5.2% by weight copper, 0.1–4.5% by weight iron and 0.2–2.5% by weight molybdenum, relative to the zeolite weight.

21. The method according to claim 20, wherein the mordenite type zeolite exhibits a SiO$_2$:Al$_2$O$_3$ molar ratio of more than 8.

22. The method according to claim 20, wherein the catalyst is used as a surface coating on a chemically inert, formed carrier constructed from a ceramic or a metal.

23. The method according to claim 20, wherein the temperature is in the range of 250°–550° C.

24. The method according to claim 20, wherein the space velocities are in the range of 2,000–40,000 h$^{-1}$, corresponding to a catalyst-area velocity of 1–70 m$^3$/h·m$^2$.

25. The method according to claim 20, wherein the molar ratio between nitrogen oxide and ammonia is in the range of 0.6–1.6.

26. The method according to claim 20, wherein the oxygen component of at least 0.1% by volume is presently waste gas.

27. The method according to claim 20, wherein the mordenite type zeolite exhibits a SiO$_2$:Al$_2$O$_3$ molar ration in the range of 10–30.

28. The method according to claim 20, wherein the mordenite type zeolite exhibits a SiO$_2$:Al$_2$O$_3$ molar ration in the range of 15–25.

29. The method according to claim 22, wherein said carrier is in a monolithic form, a honeycomb form, or a bulk form.

30. The method according to claim 20, wherein the catalyst is formed with a binder, said catalyst is used as a form body in monolithic form, a honeycomb form, or a bulk form.

31. The method according to claim 20, wherein said temperature is in the range of 280°–500° C.

32. The method according to claim 20, wherein said temperature is in the range of 300°–480° C.

33. The method according to claim 20, wherein said space velocities are in the range of 3,000–20,000 h$^{-1}$, corresponding to a catalyst-area velocity of 3–45 m$^3$/h·m$^2$.

34. The method according to claim 20, wherein said space velocities are in the range of 5,000–10,000 h$^{-1}$, corresponding to a catalyst surface load of 5–15 m$^3$/h·m$^2$.

35. The method according to claim 20, wherein the molar ratio between nitrogen oxide and ammonia is in the range of 0.7–1.1.

36. The method according to claim 20, wherein the molar ration between nitrogen oxide and ammonia is in the range of 0.8–1.0.

37. The method according to claim 20, wherein an oxygen component of at least 0.5% by volume is present in the waste gas.

38. The method according to claim 20, wherein an oxygen component of at least 1.0% by volume is present in the waste gas.

39. A method for the reduction of oxides of nitrogen present in waste gases containing oxygen, comprising mixing the waste gases containing nitrogen oxides with ammonia gas and passing said mixture at a temperature in the range of from 200°–600° C. with a space velocity of 1,000–60,000 h$^{-1}$ corresponding to a catalyst area velocity of 0.5–100 m$^3$/h·m$^2$ at standard temperature and pressure over a mordenite type zeolite catalyst including 0.2–5.2% by weight copper and 0.2–2.5% by weight molybdenum, relative to the zeolite weight.

40. The method according to claim 39, wherein the mordenite type zeolite exhibits a SiO$_2$:Al$_2$O$_3$ molar ration of more than 8.

41. The method according to claim 39, wherein the catalyst is used as a surface coating on a chemically inert, formed carrier constructed from a ceramic or a metal.

42. The method according to claim 39, wherein said temperature is in the range of 250°–550° C.

43. The method according to claim 39, wherein space velocities are in the range of 2,000–40,000 h$^{-1}$, corresponding to a catalyst-area velocity of 1–70 m$^3$/h·m$^2$.

44. The method according to claim 39, wherein the molar ratio between nitrogen oxide and ammonia is in the range of 0.6–1.6.

45. The method according to claim 39, wherein an oxygen component of at least 0.1% by volume is present in the waste gas.

46. The method according to claim 39, wherein the mordenite type zeolite exhibits a SiO$_2$:Al$_2$O$_3$ molar ration in the range of 10–30.

47. The method according to claim 39, wherein the mordenite type zeolite exhibits a SiO$_2$:Al$_2$O$_3$ molar ration in the range of 15–25.

48. The method according to claim 41, wherein said carrier is in a monolithic form, a honeycomb form, or a bulk form.

49. The method according to claim 39, wherein the catalyst is formed with a binder, said catalyst is used as a form body in monolithic form, a honeycomb form, or a bulk form.

50. The method according to claim 39, wherein said temperature is in the range of 280°-500° C.

51. The method according to claim 39, wherein said temperature is in the range of 300°-480° C.

52. The method according to claim 39, wherein said space velocities are in the range of 3,000-20,000 h$^{-1}$, corresponding to a catalyst-area velocity of 3-45 m$^3$/·m$^2$.

53. The method according to claim 39, wherein said space velocities are in the range of 5,000-10,000 h$^{-1}$, corresponding to a catalyst surface load of 5-15 m$^3$/h·m$^2$.

54. The method according to claim 39, wherein the molar ration between nitrogen oxide and ammonia is in the range of 0.7-1.1.

55. The method according to claim 39, wherein the molar ratio between nitrogen oxide and ammonia is in the range of 0.8-1.0.

56. The method according to claim 39, wherein an oxygen component of at least 0.5% by volume is present in the waste gas.

57. The method according to claim 39, wherein an oxygen component of at least 1.0% by volume is present in the waste gas.

* * * * *